(12) United States Patent  
Zilles et al.

(10) Patent No.: US 9,819,792 B2  
(45) Date of Patent: Nov. 14, 2017

(54) INTEGRATED CUSTOMER CONTACT CENTER TESTING, MONITORING AND DIAGNOSTIC SYSTEMS

(71) Applicant: Integrated Research Limited, North Sydney (AU)

(72) Inventors: Russell Zilles, Woodbury, MN (US); Shan Brickey, Woodbury, MN (US); Michael Burke, Minneapolis, MN (US); Alessandro Caffari, Bloomington, MN (US); Christopher Dorrington, North Sydney (AU); Alexander Baburin, Manly (AU)

(73) Assignee: Integrated Research Limited, North Sydney (AU)

( * ) Notice: Subject to any disclaimer, the term of this patent is extended or adjusted under 35 U.S.C. 154(b) by 0 days.

(21) Appl. No.: 15/004,924

(22) Filed: Jan. 23, 2016

(65) Prior Publication Data

US 2016/0219143 A1    Jul. 28, 2016

Related U.S. Application Data

(60) Provisional application No. 62/106,952, filed on Jan. 23, 2015.

(51) Int. Cl.  
*H04M 1/24* (2006.01)  
*H04M 3/08* (2006.01)  
*H04M 3/22* (2006.01)  
*H04M 3/24* (2006.01)  
*H04M 3/51* (2006.01)

(52) U.S. Cl.  
CPC .......... *H04M 3/242* (2013.01); *H04M 3/5166* (2013.01)

(58) Field of Classification Search  
USPC ........................................ 379/9, 9.02, 15.01  
See application file for complete search history.

(56) References Cited

U.S. PATENT DOCUMENTS

| 5,495,521 | A | 2/1996 | Rangachar |
| 5,933,475 | A | 8/1999 | Coleman |
| 6,427,000 | B1* | 7/2002 | Mumford .............. H04M 3/242 379/10.03 |

(Continued)

OTHER PUBLICATIONS

International Search Report and Written Opinion rendered by the International Searching Authority for PCT/US16/14647, dated Apr. 8, 2016, 12 pages.

*Primary Examiner* — Quoc D Tran  
(74) *Attorney, Agent, or Firm* — Skaar Ulbrich Macari, P.A.

(57) ABSTRACT

An external contact center testing system is integrated with an internal monitoring and diagnostic system to identify and verify a fault condition, and to determine the cause of such fault condition. Test data for each of the stimuli launched into the call center from the external testing system are synced with the monitoring results data generated by the internal monitoring system. The synced results can be analyzed to verify that a true fault has occurred and also to identify both failure conditions and specific hardware malfunctions giving rise to the noted failure. The internal monitoring system can interface with the external testing system to cause one or more testing stimuli to be launched by external testing system. The internal monitoring data can also be linked to the external testing data for drill-down viewing by a user.

20 Claims, 9 Drawing Sheets

(56) References Cited

U.S. PATENT DOCUMENTS

| | | | |
|---|---|---|---|
| 7,680,250 B1 | 3/2010 | Zilles et al. | |
| 8,270,588 B2 | 9/2012 | Schwartz | |
| 8,418,000 B1* | 4/2013 | Salame | G06F 11/079 |
| | | | 714/26 |
| 2004/0008825 A1* | 1/2004 | Seeley | H04M 3/22 |
| | | | 379/32.01 |
| 2009/0282292 A1* | 11/2009 | Squire | H04L 41/0631 |
| | | | 714/39 |
| 2011/0150189 A1* | 6/2011 | Kulkarni | H04M 3/323 |
| | | | 379/32.01 |
| 2014/0006869 A1 | 1/2014 | Rozmaryn | |
| 2016/0072945 A1* | 3/2016 | Kulkarni | H04M 3/2281 |
| | | | 379/88.01 |

\* cited by examiner

| CONFIGURATION | |
|---|---|
| SERVER NAME: | AVAYA#CM#CSTA#AAA |
| LOGIN ID: | LOGIN |
| PASSWORD: | 123ABC |
| AGENT ID: | 2010 |
| AGENT EXTENSION: | 40001 |
| AGENT PASSWORD: | 2010 |
| WEB SERVICE TIMEOUT: | 30 |
| WEB SERVICE RETRY INTERVAL: | 30 |
| WEB SERVICE MAX ATTEMPTS: | 4 |
| WEB SERVICE URL: | HTTPS://MONITORCONTROL.NET/VCREFLECTOR/VCREFLECTOR.WS |
| | SAVE |

Fig. 10

INTEGRATED CUSTOMER CONTACT CENTER TESTING, MONITORING AND DIAGNOSTIC SYSTEMS

PRIORITY

This application claims the priority benefit of U.S. Provisional Application No. 62/106,952, filed on Jan. 23, 2015, which is hereby incorporated herein by reference in its entirety.

FIELD

The present invention relates generally to contact center monitoring, communications systems and testing systems, and more particularly, to integrated internal and external testing and monitoring systems for contact centers.

BACKGROUND

A linchpin of success for any business is its ability to communicate effectively with its customers. One of the primary means of communication a business has with its customers is through a contact center. In a contact center, typically a customer telephone call is launched through the telephone network and is received by the call center portion of the business' contact center. Then a series of prompts query the customer for their account data and purpose of the call. The customer inquiry is next routed to an appropriate agent (either virtual or live) for handling the customer's issues that prompted the inquiry. As part of handing the customer off to an agent, the customer's account data may be displayed on the agent's computer terminal or desktop via screen pop in order to avoid duplicating the query process and to minimize the call time. Another essential means of communication a business has with its customers is through its enterprise telecommunications system, known as a private branch exchange (PBX) or Unified Communications (UC) system.

All communication systems and/or networks are, unfortunately, susceptible to periodic malfunctions and failure. When a system for communicating with customers malfunctions or fails, the customer may become frustrated and dissatisfied, which may also cause such customer to post negative reviews via various social media and review websites.

Internal monitoring and diagnostic software executing on computer systems for a contact center has been developed to determine the cause of a failure or malfunction once one has occurred. The internal monitoring software interfaces onsite with the internal systems of the contact center, such as the private branch exchange (PBX) and Interactive voice response (IVR) subsystems. The monitoring software monitors the performance of the contact center subsystems as the subsystems react to and process an incoming customer call or calls. However, there is no ability to inject calls into the contact center system from the public telephone exchange or control the activity of the incoming calls. Moreover, the internal monitoring and diagnostic software is not capable of testing the contact center's operations as a customer would experience them and determine whether any irregularities or other indicators of impending malfunction or failure are occurring.

External testing systems have been developed to aid businesses in verifying the proper operation of certain aspects of their contact center systems. Tests can be performed to verify that the system is available, can handle a certain simultaneous volume of calls, is accurately responding to customer input, is correctly prompting the customer and is accurately responding to customer input. Such external testing often involves launching one or more pseudo-customer calls through the public telephonic communication system to the customer contact center. From there, input can be provided as if the call were an actual customer, and call progress detection can be employed to verify the correct functioning of the contact center response systems as compared to expected responses. One such method for external testing the automated prompting systems is provided in U.S. Pat. No. 5,933,475, which is incorporated herein by reference in its entirety.

Conventional external testing systems for contact centers provide useful data about the occurrence of a failure or other irregularity or malfunction in the various facets of a customer contact center. But conventional external testing systems are unable to determine the root cause of the noted failure/irregularity/malfunction because there is no interface to diagnose the contact center's actual systems. And without such diagnosis, automated correction of the failure cannot be performed.

Additionally, public telephone infrastructure and hardware limitations can cap the number of simultaneous calls that a given testing services vendor can employ from a given location. Thus, additional outbound test call centers may be needed if the test call volume exceeds capacity for a given test call launching center. Maintaining multiple locations is, of course, very expensive.

Conventional external call testing systems also do not have the ability to test the accuracy of the information presented to the agent's terminal once the customer call is handed off.

Therefore, there remains a need to improve monitoring and testing systems for contact centers, PBXs and UCs.

SUMMARY

The present invention addresses certain drawbacks of conventional contact center/communication system monitoring and testing systems. The disclosure includes an external contact center testing system that is integrated with an internal monitoring and diagnostic system to identify and verify a fault condition, and to determine the cause of such fault condition. Test data for each of the stimuli launched into the call center from the external testing system are synced with the monitoring results data generated by the internal monitoring system. The synced results can be analyzed to verify that a true fault has occurred and also to identify both failure conditions and specific hardware malfunctions giving rise to the noted failure. The internal monitoring system can interface with the external testing system to cause one or more testing stimuli to be launched by an external testing system. The internal monitoring data can also be linked to the external testing data for drill-down viewing by a user.

The disclosure also includes a modular external contact center monitoring and testing system including a plurality of different test engines to conduct testing of a client's customer contact center. A respective translator communicates testing requirements from the testing system to the test engine(s) and translates the resulting test data back to the testing system.

The disclosure further includes an agent desktop screen pop testing system configured to gather data from the computer telephony integration (CTI) server in the customer contact center being tested and reports the data back to one or more of the external testing system and the internal monitoring and diagnostic system.

The above summary is not intended to limit the scope of the invention, or describe each embodiment, aspect, implementation, feature or advantage of the invention. The detailed technology and preferred embodiments for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

BRIEF DESCRIPTION OF THE DRAWINGS

FIG. 10 is a configuration screen for an agent screen pop testing system for a contact center according to certain embodiments of the invention.

Figure 1:
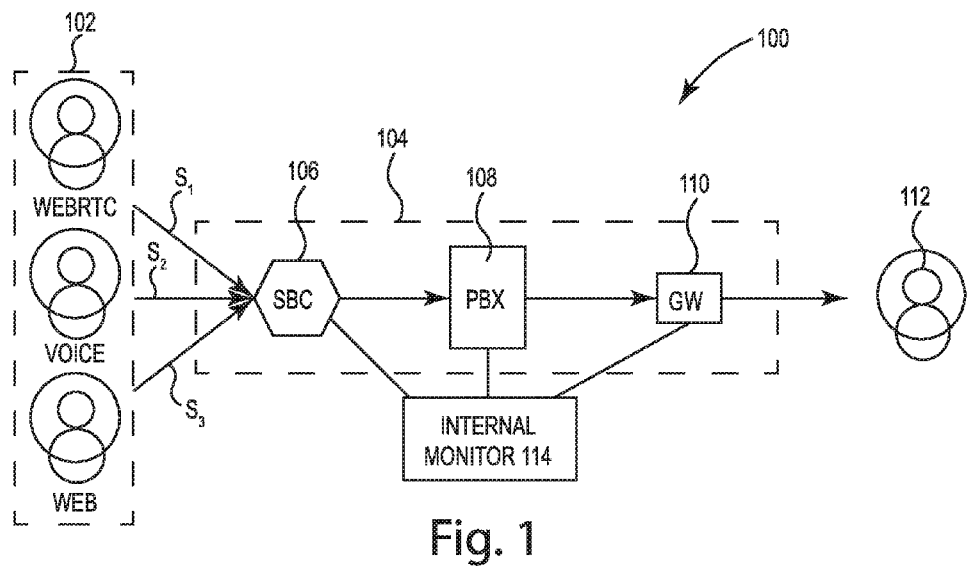
FIG. 1 is a diagram of an integrated internal/external testing and monitoring system for contact centers and communication systems according to certain embodiments of the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Referring to FIG. 1, a diagram of an integrated contact center testing, monitoring and diagnostic system 100 is provided. The system generally includes an external testing system 102 that can launch one or more test stimuli $S_1$, $S_2$ $S_3$, etc. into a customer contact center 104. The contact center receives the incoming stimuli and routes it through a plurality of subsystems, such as a session border controller (SBC) 106, a PBX system 108, a gateway (GW) 110 and an IVR system (not shown in FIG. 1), before ultimately being routed, if applicable, to an agent 112. Of course, the customer contact center 104 may comprise, more, fewer and different internal subsystems than are indicated in FIG. 1 without departing from the scope of the invention.

An internal monitoring and diagnostic system 114 actively monitors one or more of the contact center 104 subsystems 106, 108 and 110. The internal monitoring and diagnostic system 114 may be in the form of software code that is stored on a storage device (e.g. hard drive) in one or more of the subsystems of the contact center. The internal monitoring and diagnostic system 114 can also be in the form of software stored on a storage device in a discreet computing device that is coupled to or networked with one or more subsystems of the contact center that are being monitored.

The internal monitoring and diagnostic system 114, such as the PROGNOSIS system from Integrated Research Limited, is generally configured to monitor and record various data regarding each stimuli that are reacted to by each monitored subsystem, as well as certain performance data for each monitored subsystem as that subsystem reacts to the stimuli. For example, for a customer voice call, the internal monitoring and diagnostic system 114 may record one or more of the following data: Automatic Number Identification (ANI); Dialed Number Identification Service (DNIS); start time of communication; end time of communication; duration of communication; extension number of parties engaged in the communication; calling extension; receiving extension; recorder identification (ID); call ID; location of participants in communication; call duration; latencies; and data packet counts. The internal monitoring and diagnostic system 114 software will be referred to as the internal monitor in the balance of this application.

The external or outside testing system 102 generally comprises one or more test engines that are configured to generate test stimuli and launch those stimuli into the customer contact center. A control system is provided to schedule, execute and monitor the progress of a test event. One example external testing system is described in U.S. Pat. No. 7,680,250, which is hereby incorporated herein by reference in its entirety. External testing systems will be discussed in greater detail later in this application.

The stimuli launched into the contact center 104 by the external testing system 102 can be of any type utilized by the contact center. Typical stimuli can include a voice call $S_2$, a web inquiry $S_3$ (e.g. a customer requesting help on a businesses' website), and a Web Real-Time Communication (WebRTC) interaction $S_1$. WebRTC is an API definition drafted by the World Wide Web Consortium (W3C) that supports browser-to-browser applications for voice calling, video chat, and P2P file sharing without the need of either internal or external plugins. The external testing system is not limited to just these specific types of stimuli generation however.

The external testing system 102 can be used to test the contact center in a variety of ways, including a volume test to see if the contact center can successfully handle a given volume of stimuli simultaneously, and a verification test to see if the contact center reacts to the call and inputs made during the call in an expected manner.

Figure 2:
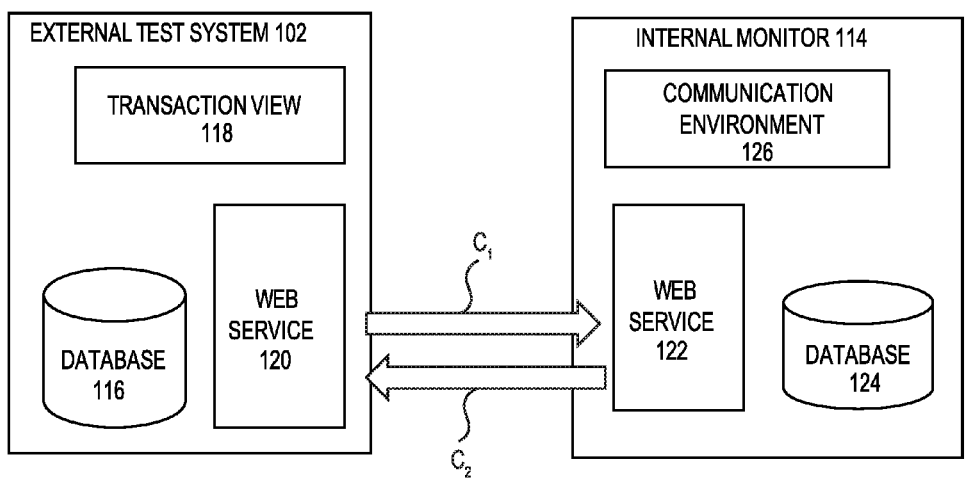
FIG. 2 is a diagram of an integrated internal/external testing and monitoring system for contact centers and communication systems according to certain embodiments of the invention.

Referring now to FIG. 2, additional aspects of the external testing system 102, the internal monitor 114 and interactions there between will now be discussed. The external testing system 102 includes a database 116 to record and store on storage media the test data and results of the test. The test data can include the type of stimulus, time of test, duration, destination, etc. The results can include a pass/fail indication, time of commencement, time of finish and time of any noted failures.

A transaction view subsystem 118 provides a web portal for viewing the test results data. Again, U.S. Pat. No. 7,680,250 provides additional disclosure regarding test data and the customer viewing interface.

The external testing system 102 also includes a web service subsystem 120. This subsystem allows the external testing system to engage in two-way communication with the internal monitor 114. Preferably the communication is via https protocol, which is secured, but does not require that a VPN be established.

The internal monitor 114 includes a corresponding web service subsystem 122, a database 124 for recording the monitor system data and a communication environment 126 that enables a customer or technician to interact with the internal monitor system 114.

The arrows $C_1$ and $C_2$ illustrate that there are two-way communications occurring between the external test system 102 and the internal monitor 114. Having two-way communication enables several functions not possible with conventional separate external and internal systems. The two-way communication can occur as part of a local area network (LAN), wide area network (WAN), the World Wide Web (i.e., the Internet), cellular or any other network configuration. The communication can be wireless, wired, a combination of wire/wireless, or by other means.

In one aspect, the test data viewed via the client portal 118 of the external testing system (e.g. as discussed in U.S. Pat. No. 7,680,250) allows the customer to drill down into the results of a given external test and see the time-synced internal monitor data that corresponds specifically to that test. In an example implementation, the test data in the client web portal contains a link to the corresponding internal monitor data. The linking of the internal and external data provides a richness of details on failed calls that allows for significantly faster problem resolutions.

In another aspect, the internal monitor can interact with the external test system to trigger one or more tests. More specifically, the internal monitor may detect an abnormality in one or more subsystems of the contact center. The internal monitor communicates a test request or trigger to the external testing system, which then launces the requested stimuli into the contact center. The internal monitor can then monitor the subsystem in question to observe whether the abnormality persists and whether a failure is noted by either the external testing system or the internal monitor. An appropriate alert can be set and communicated to appropriate personnel for resolution, or an automated resolution can be activated (e.g. re-routing to alternative or backup call center resources, or a re-boot of the subsystem at issue). This aspect allows the internal and external system to act as a double-check on one another so that alerts are issued only upon a verified problem. The internal monitor can investigate the problem and initiate corrective actions. Moreover, the frequency, and corresponding cost, of human interactions with the contact center subsystems can be reduced.

As can be appreciated from this disclosure, the internal monitor 114 can perform detailed automated diagnosis of problems in contact center systems. One or more specific tests can be launched automatically by the external testing system 102 at the request of the internal monitor when any anomaly is noted. Such automated tests can be performed in one or more cycles to allow the internal monitor to verify that a true problem exists, narrow down the particular subsystem where the problem is occurring, and then perform an automated fix and/or alert appropriate personnel of the condition. Thus, contact center downtime can be reduced at the same time that the number of technical personnel needed to monitor and maintain the contact center can be reduced.

Since the integrated system can flag irregularities in the contact center, the internal monitor can proactively switch or re-route to backup resources or alternative subsystems to proactively avoid a failure. The components or subsystems predicted to fail can also be flagged for expedited maintenance before a catastrophic failure occurs.

Another advantage of the integrated internal/external system 100 is the ability to compare or match up the external testing system's notification of errors with the internal system's diagnostic capabilities. This permits the client to be informed of both the presence of the problem and the root cause of the problem.

Figure 3:
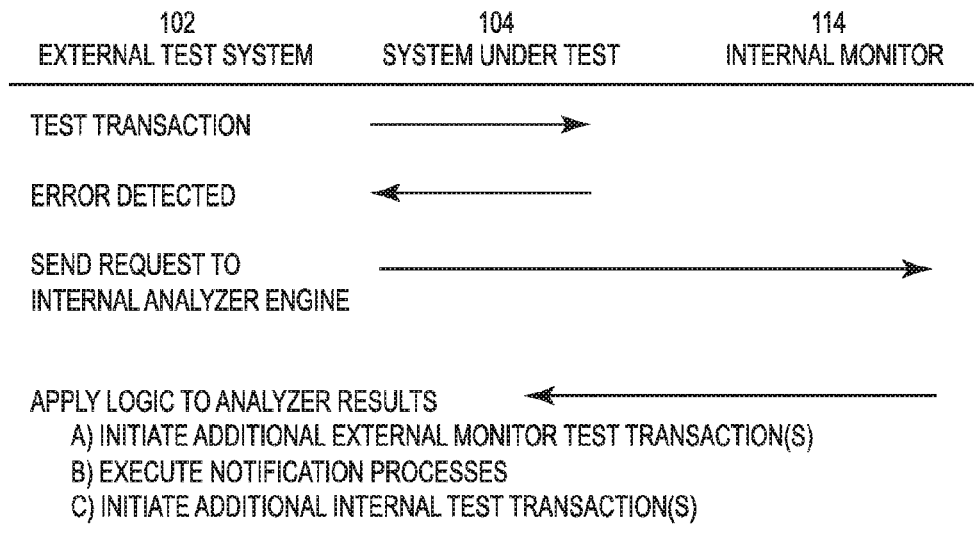
FIG. 3 is a diagram of testing and diagnosis process flow for contact centers according to certain embodiments of the invention.
Figure 4:
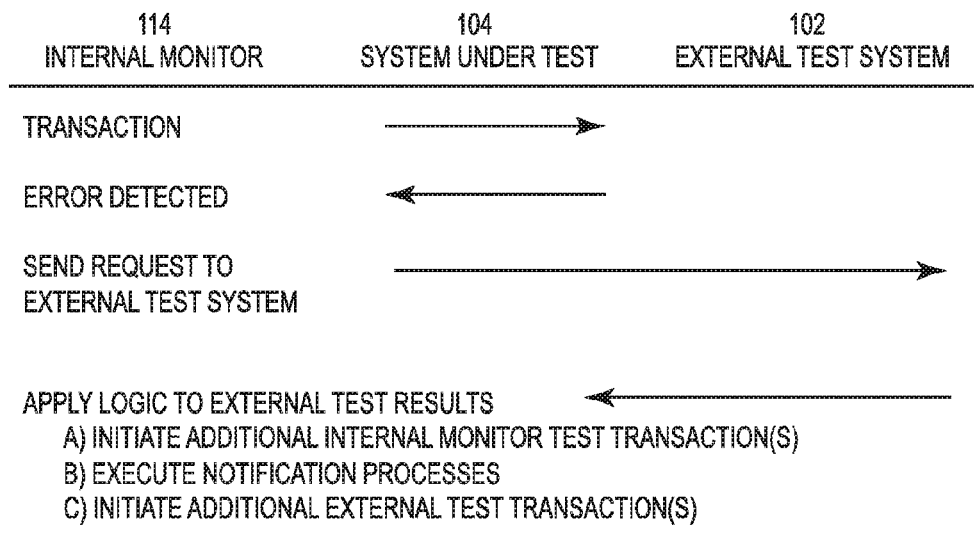
FIG. 4 is a diagram of testing and diagnosis process flow for contact centers according to certain embodiments of the invention.

FIGS. 3 and 4 illustrate examples of information flow between the external testing system 102, internal monitor 114 and the contact center 104 undergoing testing/monitoring. In FIG. 3, the external test system 102 detects the error initially. In FIG. 4, the internal monitor 114 detects the error initially.

Referring to FIG. 3, the external test system 102 launches a stimuli into the contact center 104. The results of the external test are collected, stored and available for viewing via the web portal. If an error is detected by the external test system 102, then the external test system sends a request to the internal monitor to retrieve the corresponding internal monitor test data. A logic engine (e.g. software residing in the external test system or the internal monitor) verifies whether both the external and internal system agree if there is a problem. If true, then a notification process and/or an automated remedy can be initiated. If false, then one or more additional tests are performed to see if the potential problem noted by one of the internal and external systems repeats. Repeated same problems by one of the internal and external systems can be treated as a verified problem even if the other of the internal or external systems do not also flag the same problem.

Referring now to FIG. 4, the internal monitor 114 notes an anomaly in the contact center 104. Then the internal monitor 114 initiates a test by the external testing system 102 so that the test result data can be compared by a logic engine for a match. The logic noted in the preceding paragraph is again followed to resolve whether the anomaly will be flagged as a true problem.

The logic engine (e.g. software code) that compares the data from both of the internal monitor 114 and the external testing system 102 can reside within either of the external testing system 102 or the internal monitor 114. For example, the logic engine can reside within one, or both, of test servers or in a separate server, any combination thereof. Also, the logic engine can initiate the additional tests noted in the diagram by adding the test data to the ad hoc table 324, which causes the schedule communicator 328 to carry forward with the tests as described previously. The ad hoc table 324 and schedule communicator 328 will be discussed below in relation to FIGS. 6A and 6B.

The test results from the internal monitoring systems 114 can be routed through a translator if the test results are not already encoded for storage in the external database 116 and understandable by the external testing system's 102 logic engine.

In an example use, a customer can view detailed results data from both of the internal 116 and external 124 databases for a given test by the external test system 102. The customer accesses the transactional view interface 118 of the external testing system 102 and selects one of the listed external calls from the transactions list. This causes the external testing system 102 to send a command via the web service 120 to the corresponding web service 122 of the internal monitor 114 to retrieve the corresponding call identifying information based upon correlation data such as calling ANI, Start Time and End Time. The internal monitor 114 then retrieves the corresponding internal monitoring data from its database 124 for the customer's selected call and displays the data in a communication environment 126 (e.g. web page window (s)) for the internal monitor 114.

Figure 5:
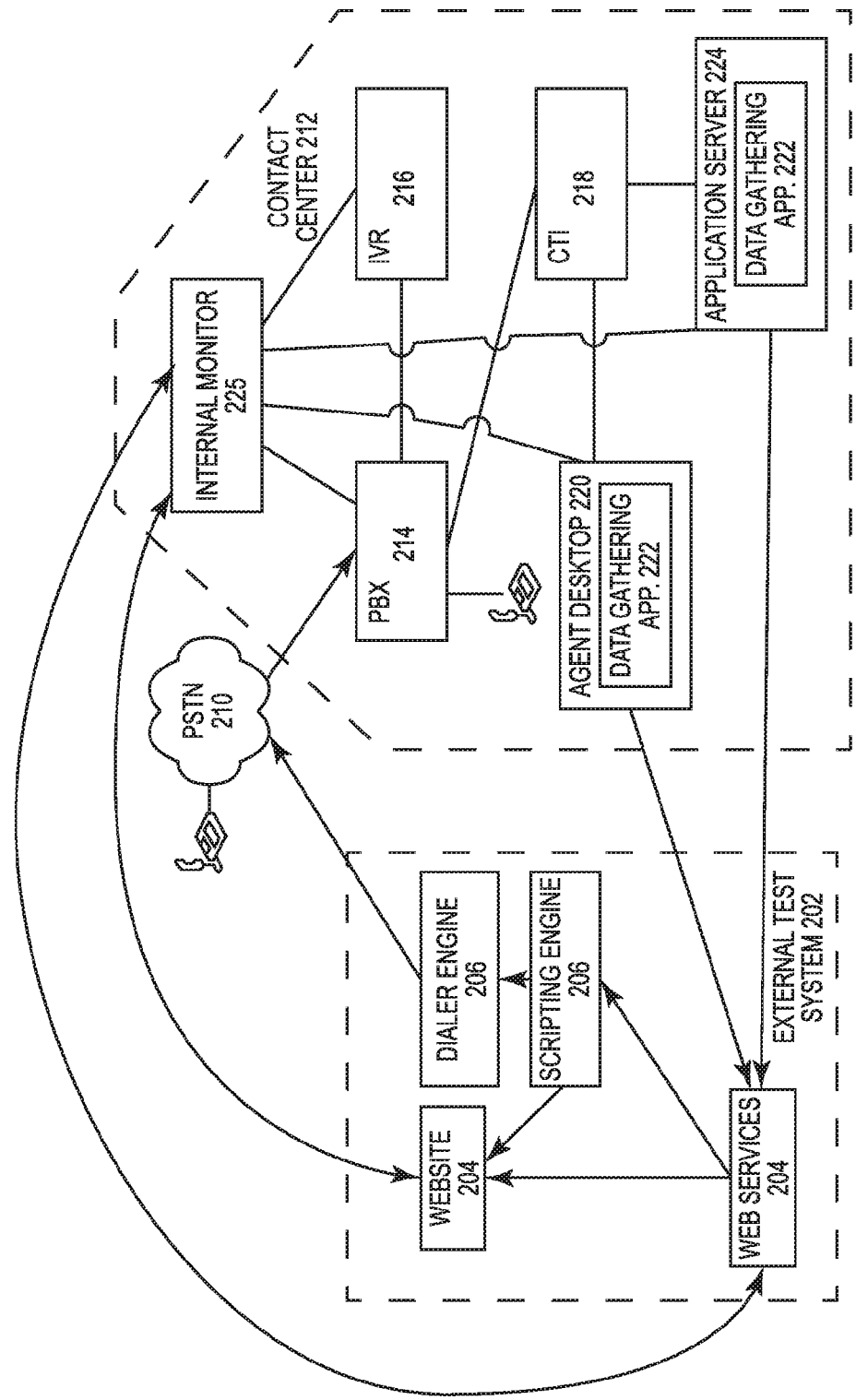
FIG. 5 is a diagram of an integrated testing, monitoring and diagnostic system according to certain embodiments of the invention.

Referring now to FIG. 5, further detail of the respective system architectures will now be discussed. The external testing system 202 includes a user/customer web interface server 204 as discussed previously, along with a dialer engine 206 and a scripting engine 208. These engines 206 and 208 are used to launch one or more calls through the public switched telephone network (PSTN) 210 to the target contact center 212 to be tested.

The test call (or stimuli) incoming to the contact center 212 is received by the PBX system 214. The IVR system 216 prompts the caller (in this case the testing server 206) for the customer account information. Such information is provided according to the test scripts. Then the computer telephony integration (CTI) server 218 is queried to provide the customer's account data to the agent desktop 220 as the customer call is routed to the agent 220.

A data gathering software program 222 collects the corresponding customer data that is transmitted from the CTI server 218 to populate the fields on the agent desktop screens. In one example embodiment, the data gathering program 222 can reside on an agent desktop terminal or computer 220. In another embodiment, the data gathering program 222 can reside on a stand-alone application server 224 coupled to the CTI server 218. In further embodiments, the data gathering program 222 can reside on both an agent desktop 220 and an application server 224.

Locating the data gathering program 222 on the agent desktop device 220 allows for gathering and reporting of the information incoming to that specific desktop.

The application server 224 can be used to emulate any desired number of agent desktops without requiring a corresponding number of physical agent desktop terminals. Each emulated agent desktop is designated to have a unique address, so the CTI server 218 thinks that it is communicating with a regular agent desktop in the case of each such address. Thus, the contact center system can be tested for its operation and performance for a larger number of agent desktops than are currently deployed, and the volume of incoming customer calls launched by the testing system can be varied accordingly to test the contact center under a variety of scenarios.

The internal monitor 225 is located internal to (e.g. onsite) the contact center 212. The internal monitor 225 is coupled to the PBX 214 and IVR 216 subsystems in FIG. 5. However, the internal monitor 225 can also be coupled to just one of the PBX and IVR subsystems, or the internal monitor 225 can be connected or coupled to additional or different subsystems such as the application server 224 and any other additional number of subsystems, such as web servers that handle customer web inquiries, WebRTC systems, and other associated subsystems such as firewalls, SBCs, etc.

The agent desktop device 220 and the application server 224 can be connected to either or both of the internal monitor 225 and the external testing system 202. FIG. 5 shows communication lines drawn to both the internal 225 and external 202 systems.

The data gathered from any of the contact center subsystems can be encoded (e.g. as XML) before storage in the internal monitor's database or before transmission of the data to the web service 226 of the external testing system 202. Such encoding makes for ease of storage and processing of the data by the external testing system 202 and the display of the same to the user/customer web interface 204. It should be understood that any of various widely compatible data formats can be utilized without departing from the scope of the invention.

Figure 6A:
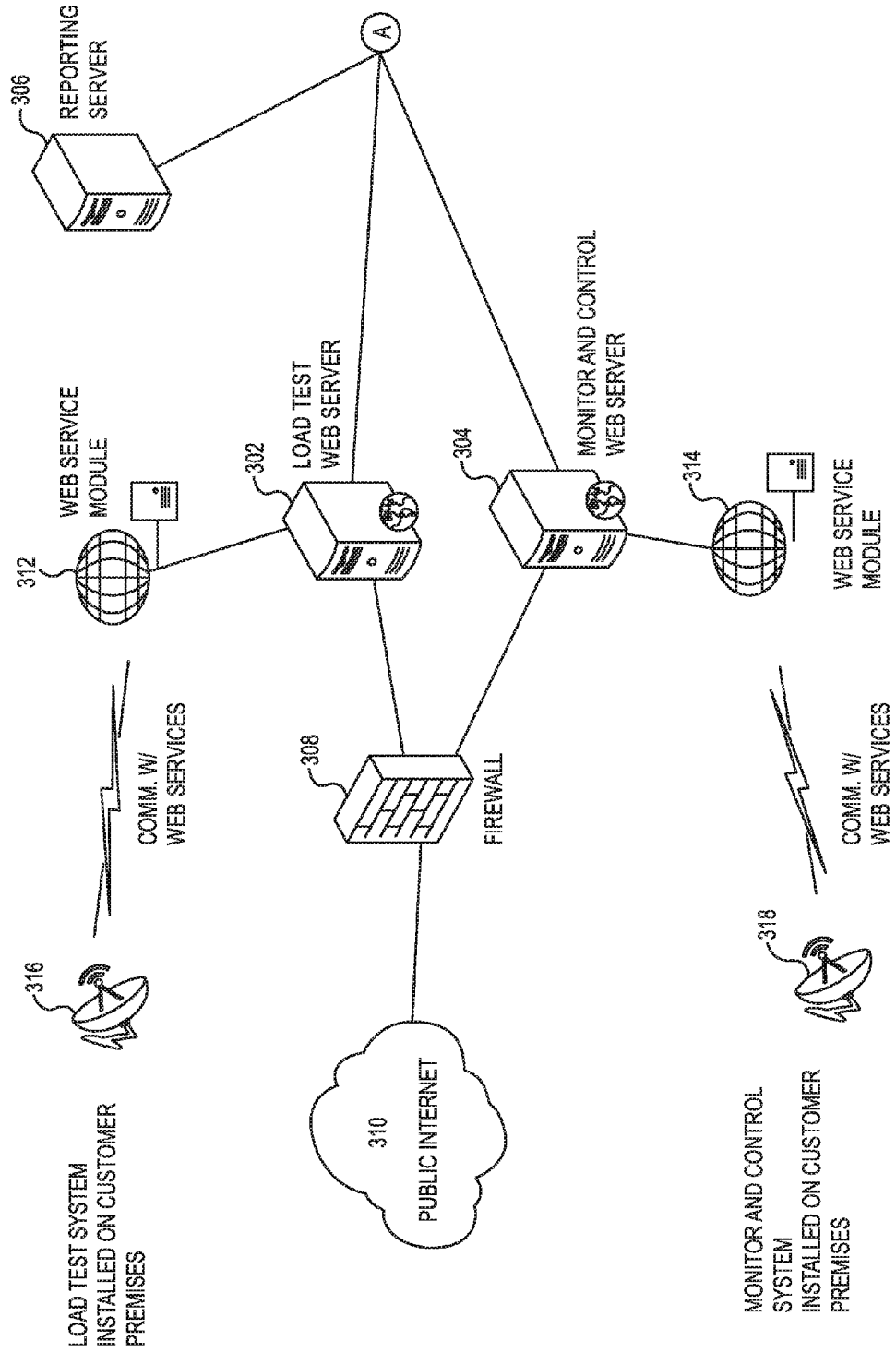
FIGS. 6A and 6B are a diagram of infrastructure for modular external testing of contact centers/communication systems according to certain embodiments of the invention.
Figure 6B:
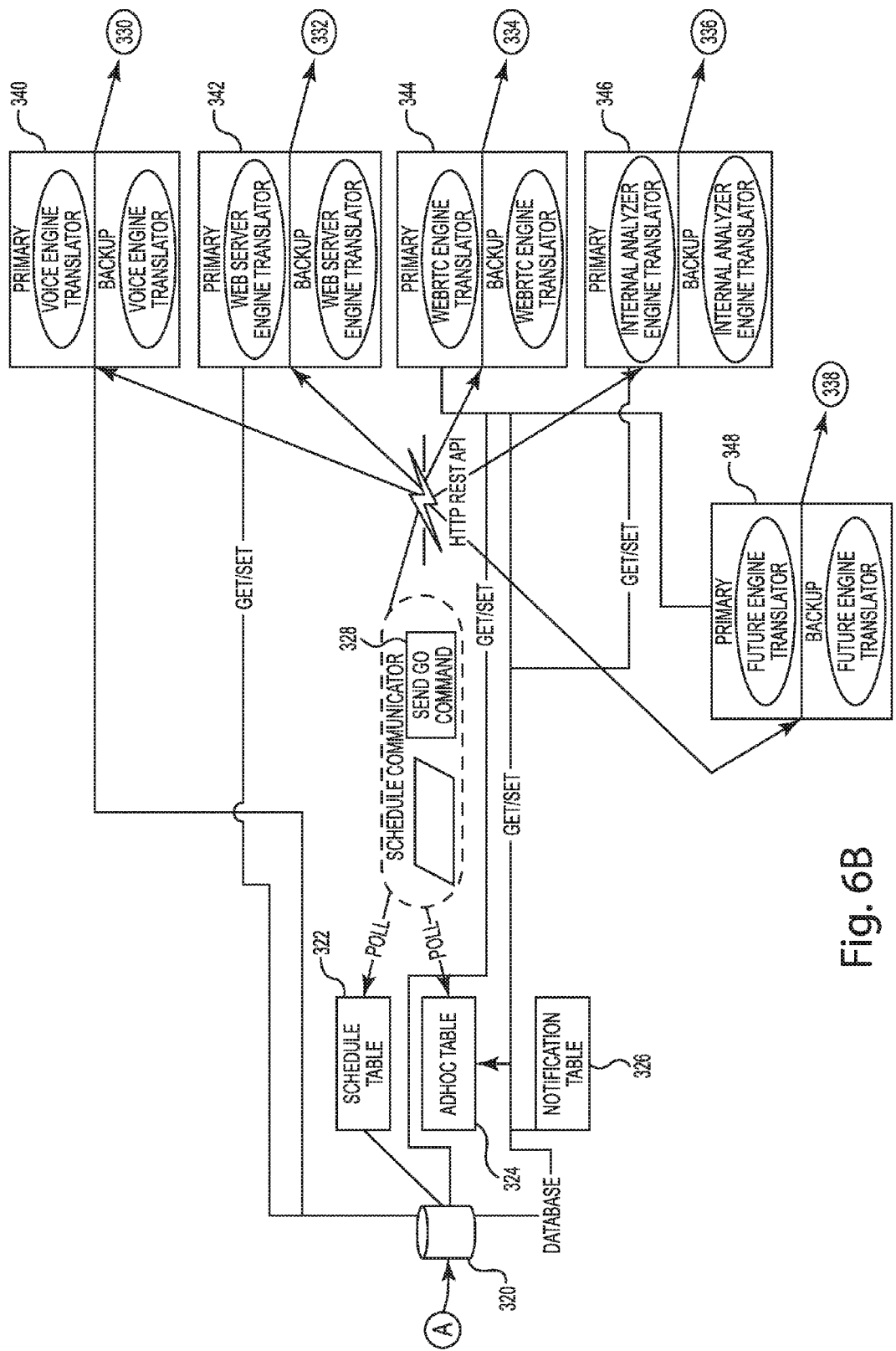

Referring next to FIGS. 6A and 6B, a modular remote testing system is shown according to an example embodiment. The modular system includes several different testing sub-systems. Here, a website load testing subsystem 302 and a call center monitoring and control system 304 are shown. However, it should be understood that other or different testing subsystems can be employed without departing from the scope of the invention. In addition, a reporting server 306 is provided for providing test report data and client-facing interactivity to clients whose contact centers are tested.

The testing subsystems 302 and 304 are located behind a firewall 308, which is linked to the public internet 310. Software and systems, such as those in U.S. Pat. No. 7,680,250, have been developed that permit customers of the testing services to monitor the real-time status of their tests as they are being performed via internet interface. Historical test data can also be provided in this manner. Customers can also be provided with the ability to alter certain viewing settings, testing parameters and notification settings via the customer web interface.

Further testing system subsystems illustrated in FIGS. 6A and 6B include a web service 312 software module for direct communication with the on-premises data collection software tool 316, which interfaces with the load testing system 302. A web service 314 software module is also provided for direct communication with the on-premises data collection software tool 318, which interfaces with the monitoring and control system 304.

The website load testing subsystem 302, the call center monitoring and control system 304, and the reporting server 306 all interact with a database 320. The database 320 includes the testing results as well as data tables for test scheduling 322, notifications 326, and other special purposes (ad hoc) 324. For example, the ad hoc table 324 can be used to schedule special tests or routines that are outside of the normally scheduled tests. That way, the regular test table need not be altered to perform such special tests. In one example, the ad hoc table 324 can be used by the internal monitoring system 114 of FIGS. 1-5 to prompt the respective testing server 302 or 304 to run a test.

A schedule communicator 328 software module interacts with the schedule table 322 and ad hoc table 324 to determine when various tests need to be run and what type of test needs to be run (i.e. type of stimuli). Then, the schedule communicator 328 interfaces with a plurality of test engines 330, 332, 334, 336 and 338 (via a respective translator 340, 342, 344, 346 and 348) to cause the appropriate engine to run a test.

Figure 7:
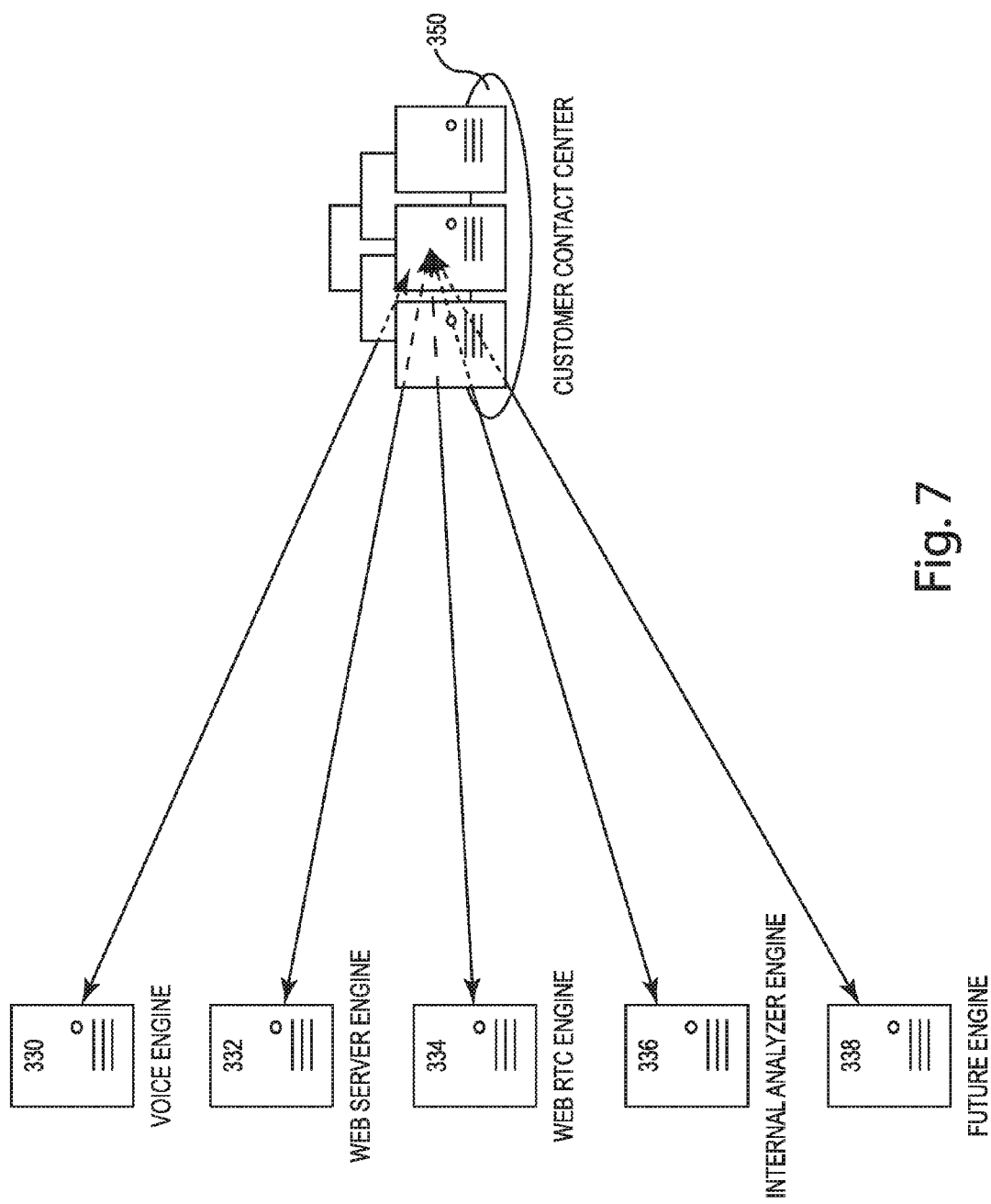
FIG. 7 is a diagram of various example types of testing engines of a modular external testing system according to certain embodiments of the invention.
Figure 8:
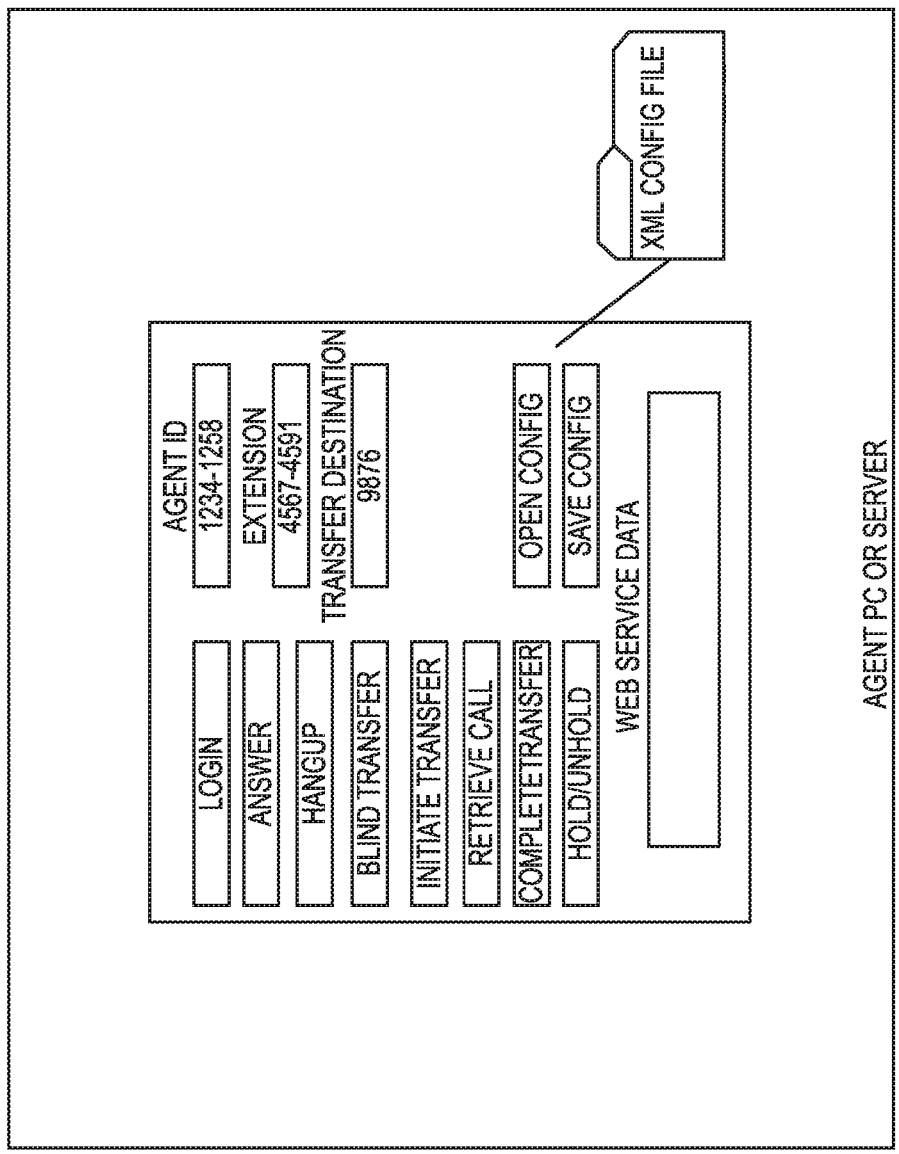
FIG. 8 is a diagram of test functions and data for agent screen pop testing system for a contact center according to certain embodiments of the invention.

Referring additionally to FIG. 7, the test engines 330, 332, 334, 336 and 338 are various different types of testing modules that can create different types of stimuli to inject into the contact center 350 to test a particular aspect or system of the contact center 350. For example, the voice engine 330 creates telephone voice calls to test the IVR system of the contact center 350. Web server engine 332 generates TCP/IP data packets to test the website of the contact center 350. The WebRTC engine 334 is configured to test Web Real-Time Communication features of the contact center 350. The internal analyzer engine 336 is configured to test the operational status of various computing systems within the contact center 350. The engine labeled "future engine" 338 denotes the potential for utilizing a testing engine to test contact center functionality that has yet to be adopted or developed. Any number of duplicate engines and/or additional new types of engines can be employed without departing from the scope of the invention.

The modular external testing system according to certain aspects is flexible because it can utilize various different types of testing engines available from third parties (or custom developed) on an as-needed and on-demand basis. This allows the testing system to deliver virtually any type of testing that a customer may need without having to modify the testing system itself.

For example, a given client wishes to have their contact center load-tested with an unusually large volume of inbound telephone calls. In order to launch such a large number of calls simultaneously, the testing system interfaces with one or more voice engines 330 hosted by a third party so that the required number of simultaneous calls can be launched. Thus, the company performing the external testing of the contact center/communication system does not need to invest in building out its calling infrastructure, but instead, the company can contract with one or more third parties to access test call capacity as needs dictate. This testing capacity modularity can also be beneficial when the aggregate call volume across multiple different clients necessitates additional call engine resources.

The modular feature of the external testing system also permits the testing system to test contact centers and other communication systems for newly adopted features almost immediately upon deployment because there is no lag for build-out or modification of the external testing system infrastructure.

Another advantage of the modular architecture of the testing system is that the testing services company avoids the costs (including equipment and staffing) to build out its systems to include new or additional testing capability and capacity equivalent to the modular engines of the present invention.

The schedule communicator 328 of the modular testing system must be able to interface with each of the various engines 330, 332, 334, 336 and 338 in order to perform the tests. And each engine may belong to a different third party or be based upon a non-native software system. Therefore, a given engine does not necessarily know how to receive instructions from, or report results to, the testing system. Thus, a series of translator software modules 340, 342, 344, 346 and 348 are included in the communication path between the testing system (e.g. schedule communicator 328) and the respective testing engines 330, 332, 334, 336 and 338.

There is a different translator associated with each different type of engine. Thus, a voice engine translator 340 is associated with the voice engine 330, a web server translator 342 is associated with the web server engine 332, etc. However, the separate translator modules can be integrated as sub-modules in a singular translator system without departing from the scope of the invention.

In an additional aspect, each translator 340, 342, 344, 346 and 348 can include the redundancy of both a primary and secondary translator. This makes the system more robust.

The schedule communicator 328 communicates with the various translators by a series of application programming interfaces (APIs), through which the various test routines and protocols are provided. Then the translators transform the schedule communicator's test routine and protocol data into the proper language and format to be understood by the target testing engine.

The testing results data from the engines 340, 342, 344, 346 and 348 is sent back to the modular external testing system for storage in the database 320. First, the engines 340, 342, 344, 346 and 348 send the data back to their corresponding translators 340, 342, 344, 346 and 348. The translators encode the test results data in an XML format. The XML encoded data is then transmitted back to the database 320 for storage and/or reporting to the client by the reporting server 306. Thus, the translators 340, 342, 344, 346 and 348 provide a two-way translation function to enable the modular testing system to talk to the various testing engines and those testing engines to report results back to the testing system in a compatible format. It should be understood that other widely compatible data formats can be utilized without departing from the scope of the invention.

Utilizing the translator modules 340, 342, 344, 346 and 348 based on each unique engine communication protocol, the modular aspect of the present invention allows external protocol engines like voice, web, and WebRTC to communicate with known internal system configuration, transaction initiation, notification and reporting systems.

The translators 340, 342, 344, 346 and 348 permit the modular testing system to interface with any testing engine for which a translator exists. This avoids the modular testing system having to be configured or re-configured for each different type of testing engine, or to have separate redundant systems such as servers 302, 304, schedule communicator 328 and database 320 for each different engine.

External contact center testing systems can also be configured to collect screen pop data used to populate desktop screens on agent computer terminals in contact centers. This allows for a more complete testing of the various aspects of the contact center. In particular, this aspect tests whether the customer's correct information is routed to the correct agent's terminal.

FIG. 7 indicates various types of data that can be captured and encoded by the data gathering program 222 from FIG. 5. The data can refer to time stamps when certain events take place, such as answer and hang-up events, or other data such as agent ID, extension and destination, calling party information such as caller ID, account number, etc.

Now an example of agent desktop testing will be described.

1) The agent desktop emulation testing module is a data gathering program that collects and communicates the data elements of a CTI screen pop event in real-time utilizing a CTI server 218 application. An example of CTI applications are an Avaya TSAPI Server and Avaya One-X environment or Genesys T-Server and Genesys Desktop.

2) The specific test process is tailored to the contact center application being monitored or tested.

3) The external testing system dialing engine (206 of FIG. 5) generates automated, scripted, test calls one at a time (or in multiples) that will access the client contact center 212 environment via the PSTN 210.

4) Each test call is answered by the client contact center application that gathers information about the inbound call from the telephony environment, including ANI, DNIS or Called Number and Call answer time.

5) The contact center application makes inquiries of the Calling Party to identify and authenticate the Calling Party, including Account number and PIN.

6) Either before authentication or after, via Dual Tone Multi Frequency (DTMF) entry or by playing a pre-recorded spoken utterance, the test call makes a functional selection from the contact center menu of options, including Account balance inquiry, Account status inquiry and PIN selection.

7) Using DTMF entry or by playing a pre-recorded spoken utterance, the test call generates an inquiry to retrieve a specific piece of information, including Account balance and Next payment due date.

8) Using DTMF entry or by playing a pre-recorded spoken utterance, the test call initiates a transfer out to an agent.

9) The CTI Server 218 transfers the call from the contact center application to the Agent Desktop 220. This transfer also contains information about the call itself as well as the calling party. This information is what is normally used to trigger an appropriate screen pop on the agent desktop with the correct skill group as well as populating fields with any relevant information, for example Time-stamped CTI event data, Key/Value Pair (KVP) info and Attached data, as appropriate.

10) The data gathering software 222 collects and buffers the screen pop data received for each screen pop event.

11) The data gathering software 222 communicates the screen pop event data to the external testing system 202, including CTI event data, Key/Value Pair (KVP) info, and other attached data, as appropriate.

12) The screen pop event data is correlated with the outbound test call data and stored in the test results database.

Specific test case scenario scripts are built based on the above-described testing process to exercise and validate contact center CTI functionality and performance based on the data collected by the data gathering software:

1) Login to CTI Server;
2) Answer inbound call, desktop data network connection only;
3) Collect and communicate screen pop event data;
4) Disconnect call;
5) Transfer call;
6) Place call on hold;
7) Retrieve held call; and
8) Logout of CTI Server.

Referring back to FIG. 5, the testing system 202 receives the agent screen pop gathered data that are transmitted via the Internet to the respective web service 226 of the external testing system or to the internal monitor 225.

Figure 9:
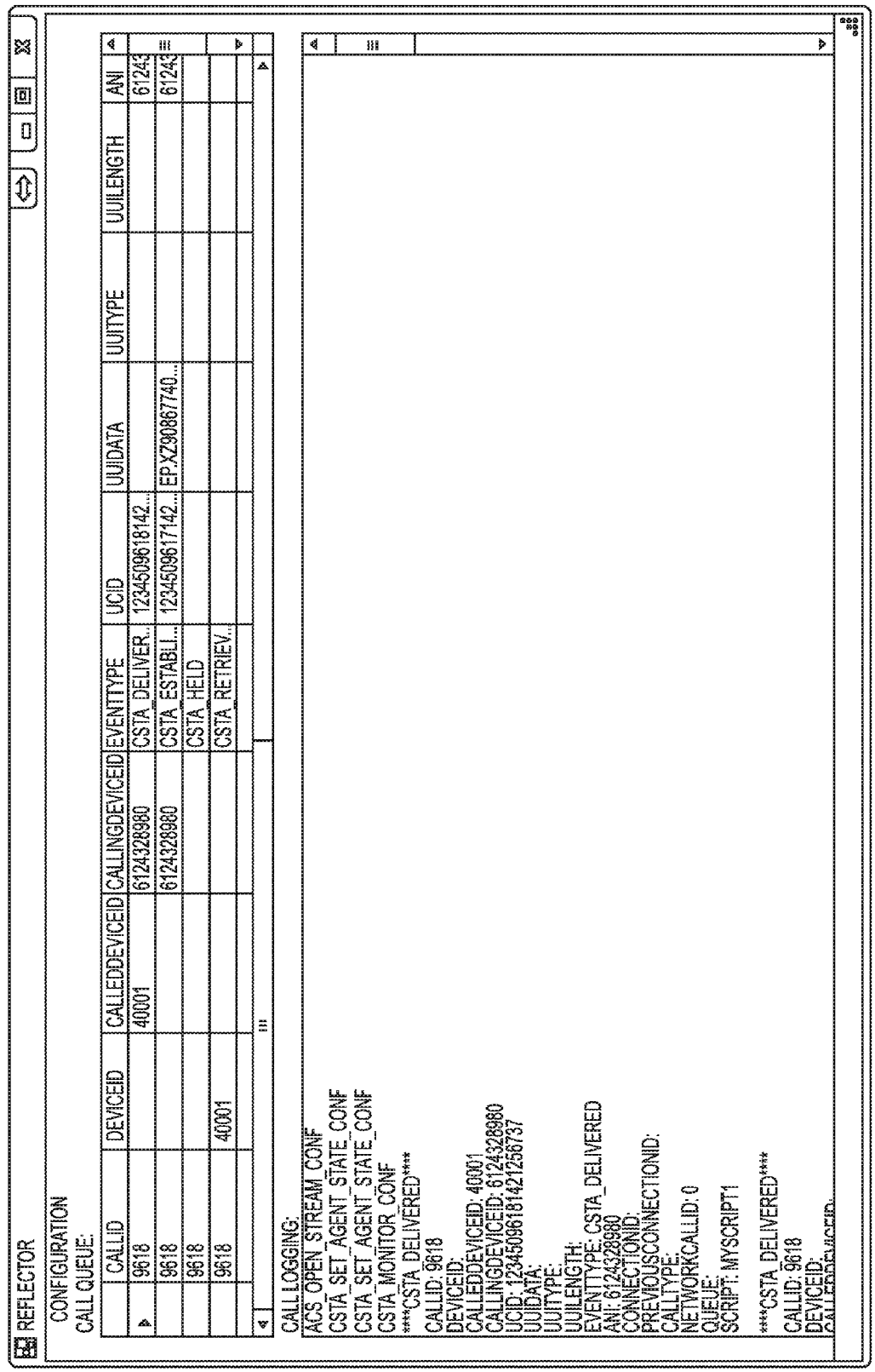
FIG. 9 is a main interface screen for an agent screen pop testing system for a contact center according to certain embodiments of the invention.

Referring to FIG. 9, a main screen for the data gathering program in the data gathering application system is shown. Gathered data can be seen in the cells of the table in the upper window of the screen. Additional listed data is shown on the lower window of the screen.

Referring to FIG. 10, a configuration screen for the data gathering program is shown. Various configuration settings can be set via this interface screen.

In an additional embodiment, the data gathering program 222 can be accessed, configured and modified remotely though the testing system or through a separate credentialing subsystem.

The various systems, subsystems, engines and modules discussed herein may comprise a computer readable program code (e.g. software program) executing on a computing device that includes a microprocessor and memory. The memory may include one or more non-volatile storage devices (e.g. a computer hard drive). The computer readable program code is stored in the memory, such as, but not limited to magnetic media (e.g., a hard disk), optical media, memory devices (e.g., random access memory, flash memory), etc. The computer readable program code is configured such that when executed by a processor, the code causes the device, system, subsystem, engine, module, etc. to perform the steps of the invention described herein. In other embodiments, the device is configured to perform steps described below without the need for code.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An integrated contact center monitoring and testing system, comprising:
a monitoring system located internal of a contact center, the monitoring system coupled to at least one subsystem of the contact center, the monitoring system comprising a monitoring results database and a monitoring web service subsystem connected to an Internet, wherein the monitoring system is configured to monitor a performance parameter of the at least one subsystem of the contact center responding to a test stimuli injected into the contact center, and record a monitored result of the contact center responding to a test stimuli in the monitoring results database; and
an external testing system located externally to the contact center, the external testing system including a test engine, a test results database and a testing web service subsystem connected to the Internet, wherein the external testing system is configured to inject the test stimuli into the contact center with the test engine and record a test result data in the test results database,
wherein a logic engine residing in at least one of the monitoring system and external testing system is configured to compare the monitored result with the test result for the test stimuli injected into the contact center and conclude whether a fault has occurred in the contact center when both the monitored result and test result indicate that the fault has occurred in response to the stimuli.

2. The system of claim 1, wherein the monitoring system is further configured to prompt the external testing system via at least one of a local area network (LAN), a wide area network (WAN) and an Internet to inject a second stimuli into the contact center.

3. The system of claim 1, wherein the test engine is a dialer engine and the test stimuli is a telephone call launched into a public switched telephone network that is coupled to a private branch exchange (PBX) subsystem in the contact center, wherein the PBX subsystem is coupled to an interactive voice response (IVR) subsystem in the contact center, wherein the monitoring system is coupled to each of the PBX subsystem and the IVR subsystem.

4. The system of claim 1, wherein the testing system includes a testing web server and a scheduling communicator, the scheduling communicator configured to communicate a test request to a translator, the translator configured to transform the test request into a translated test request for the test engine.

5. The system of claim 1, wherein the test engine reports the test result data to a translator, the translator configured to transform the test result data to the test result before the test result is recorded in the test results database.

6. The system of claim 1, further including an application server configured to emulate a plurality of agent computer terminals in the contact center, wherein the application server includes a data gathering software application to capture a screen pop data from a computer telephony integration (CTI) subsystem in the contact center, wherein at least one of the external test system and the monitoring system are coupled to the application server and store the screen pop data in the respective test results database and monitoring results database.

7. The system of claim 1, wherein the external test system includes a test results viewing portal, the external test system configured to present the test result in an html format viewable via a web browser of an internet-connected computing device, wherein the test result is linked to the monitored result such that monitored results are displayed when the linked test results are selected via the web browser.

8. A method of monitoring and testing a contact center, the method comprising:
   injecting a first test stimuli into the contact center by an external test system;
   monitoring, by a monitoring system located in the contact center, a performance result of at least one subsystem of the contact center responding to the first test stimuli;
   recording by the monitoring system the performance result in a monitoring results database;
   monitoring, by the external testing system a test result of the contact center responding to the test stimuli;
   recording by the external testing system the test result in a test results database;
   comparing the performance result to the test result for the first test stimuli;
   concluding that a fault condition exists in the contact center if both of the test result and monitoring result indicate that a fault occurred;
   injecting a second test stimuli into the contact center by the external test system if one of the test result and monitoring result indicate that a fault occurred; and
   concluding that no fault condition exists if both of the test result and monitoring result indicate that no fault occurred.

9. The method of claim 8, further comprising re-routing a customer inquiry to alternate subsystems within the contact center when the fault condition has been concluded to exist, so that the customer inquiry is not impaired by the fault condition.

10. The method of claim 8, further comprising summoning a technician only when both of the test result and monitoring result indicate that a fault occurred.

11. The method of claim 8, further comprising transforming with a translator a test request for a test engine before communicating the test request to the test engine.

12. The method of claim 8, further comprising transforming the test result from a test engine before recording the test result before the test result is recorded in the test results database.

13. The method of claim 12, wherein the test result is transformed into extensible markup language (XML).

14. The method of claim 8, further comprising:
   emulating a plurality of agent computer terminals in the contact center;
   capturing a screen pop data from a computer telephony integration (CTI) subsystem in the contact center; and
   storing the captured screen pop data in one of the test results database and monitoring results database.

15. The method of claim 8, further comprising:
   displaying the test result in a web browser;
   linking the test result for a given stimuli to a corresponding performance result for the given stimuli; and
   displaying the corresponding performance result when the linked test result is selected in the web browser.

16. A method of monitoring and testing a contact center, the method comprising:
   monitoring, by a monitoring system located in the contact center, a performance parameter of at least one subsystem of the contact center to identify whether a possible fault condition exists in the at least one subsystem;
   determining a monitoring result based upon said monitoring step;
   requesting by the monitoring system that an external testing system inject a test stimuli into the contact center when the monitoring system determines that the possible fault condition exists;
   evaluating, by the external testing system, a response by the at least one subsystem of the contact center to the test stimuli;
   determining a testing result based upon said evaluating step; and
   comparing the monitoring result to the testing result to confirm whether the possible fault condition exists in the at least one subsystem.

17. The method of claim 16, wherein the at least one subsystem of the contact center is a IVR subsystem, and wherein the test stimuli injection includes at least one telephone call launched by the external testing system into a public switched telephone network.

18. The method of claim 16, further comprising:
   summoning a technician only after a determination that the possible fault condition persists after the step of comparing the monitoring result to the testing result.

19. The method of claim 16, further comprising the external testing system deploying a plurality of test engines to inject the test stimuli into the contact center.

20. The method of claim 19, wherein the plurality of test engines comprise a first test engine configured to generate a first type of stimuli and a second test engine configured to generate a second type of stimuli, wherein the first type of stimuli is different than the second type of stimuli.

* * * * *